(12) United States Patent
Lee et al.

(10) Patent No.: US 11,982,652 B2
(45) Date of Patent: May 14, 2024

(54) NON-CONTIGUOUS SAMPLE FRACTIONATING AND CONCATENATING DEVICE AND DUAL ONLINE MULTIDIMENSIONAL LIQUID CHROMATOGRAPHY SYSTEM HAVING THE SAME

(71) Applicant: KOREA UNIVERSITY RESEARCH AND BUSINESS FOUNDATION, Seoul (KR)

(72) Inventors: Sang-Won Lee, Seoul (KR); Hangyeore Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 200 days.

(21) Appl. No.: 17/512,160

(22) Filed: Oct. 27, 2021

(65) Prior Publication Data

US 2022/0050087 A1 Feb. 17, 2022

Related U.S. Application Data

(62) Division of application No. 16/070,100, filed as application No. PCT/KR2016/012395 on Oct. 31, 2016, now abandoned.

(30) Foreign Application Priority Data

Jan. 15, 2016 (KR) ........................ 10-2016-0005394

(51) Int. Cl.
| | |
|---|---|
| *G01N 30/34* | (2006.01) |
| *B01D 15/08* | (2006.01) |
| *B01D 15/24* | (2006.01) |
| *B01D 15/32* | (2006.01) |
| *G01N 30/02* | (2006.01) |
| *G01N 30/20* | (2006.01) |
| *G01N 30/38* | (2006.01) |
| *G01N 30/46* | (2006.01) |
| *G01N 30/82* | (2006.01) |
| *G01N 30/89* | (2006.01) |

(52) U.S. Cl.
CPC ............. *G01N 30/34* (2013.01); *B01D 15/08* (2013.01); *G01N 30/82* (2013.01); *G01N 30/89* (2013.01); *B01D 15/24* (2013.01); *B01D 15/325* (2013.01); *G01N 2030/027* (2013.01); *G01N 2030/201* (2013.01); *G01N 2030/202* (2013.01); *G01N 2030/207* (2013.01); *G01N 30/38* (2013.01); *G01N 30/463* (2013.01)

(58) Field of Classification Search
CPC ............. G01N 2030/201; G01N 30/20; G01N 2030/202; G01N 2030/204; G01N 2030/205; G01N 2030/207; G01N 2030/208; G01N 30/80; G01N 30/82; G01N 30/84; G01N 2030/8411; G01N 2030/8417; B01D 15/24; B01D 15/242; B01D 15/245; B01D 15/247
See application file for complete search history.

(56) References Cited

U.S. PATENT DOCUMENTS

| | | | |
|---|---|---|---|
| 2008/0044309 A1* | 2/2008 | Yamashita | G01N 30/08 422/52 |
| 2014/0014585 A1 | 1/2014 | Dourdeville et al. | |
| 2014/0373605 A1 | 12/2014 | Nichols et al. | |
| 2015/0147397 A1 | 5/2015 | Altschuler | |
| 2015/0308986 A1 | 10/2015 | Ito | |

FOREIGN PATENT DOCUMENTS

| | | |
|---|---|---|
| CN | 102961892 | 3/2013 |
| JP | 2003254955 | 9/2003 |
| JP | 2004271272 | 9/2004 |
| JP | 2008-185558 | 8/2008 |
| JP | 2010-014429 | 1/2010 |
| JP | 2010014559 | 1/2010 |

(Continued)

OTHER PUBLICATIONS

Park et al., "Integrated analysis of global proteome, phosphoproteome, and glycoproteome enables complementary interpretation of disease-related protein networks", Scientific Reports, 5:18189, pp. Dec. 11, 2015, pp. 1-12.
Gilar et al., "Orthogonality of Separation in Two-Dimensional Liquid Chromotagphy", Analytical Chemistry, vol. 77, No. 19, Oct. 1, 2005, pp. 6426-6434.
Wagner et al., "An Automated On-Line Multidimensional HPLC System for Protein and Peptide Mapping with Integrated Sample Preparation", Analytical Chemistry, vol. 74, No. 4, Feb. 15, 2002, pp. 809-820.
Wang et al., "Reverse-phase chromatography with multiple fraction concatenation strategy for proteome profiling of human MCF10A cells", Proteomics, May 2011, vol. 11, No. 10, pp. 2019-2026.

(Continued)

*Primary Examiner* — Ryan B Huang
(74) *Attorney, Agent, or Firm* — DUANE MORRIS LLP; Gregory M. Lefkowitz; Brandon A. Chan

(57) ABSTRACT

Disclosed are non-contiguous sample fractionating and concatenating device and a dual online multidimensional liquid chromatography system having the same. The non-contiguous sample fractionating and concatenating device according to an embodiment of the present disclosure includes a sample supply module which supplies a sample to be analyzed, and a sample fractionation module connected to the sample supply module, and which is continuously supplied with the sample, sets a plurality of unit sample supply times obtained by equally dividing a total sample supply time during which the sample is supplied from the sample supply module, sets a plurality of unit fractionation intervals obtained by equally dividing each of the plurality of unit sample supply times, and concatenates and stores the sample supplied during corresponding unit fractionation intervals within each unit sample supply time to acquire a plurality of fractions.

4 Claims, 9 Drawing Sheets

(56) References Cited

FOREIGN PATENT DOCUMENTS

| | | |
|---|---|---|
| JP | 2010223884 | 10/2010 |
| JP | 2015534635 | 12/2015 |
| KR | 101120944000 | 2/2012 |
| WO | 2007012445 | 2/2007 |
| WO | 2009111229 | 9/2009 |
| WO | 2011162575 | 12/2011 |
| WO | 2015147397 | 5/2015 |

OTHER PUBLICATIONS

Yang et al., "High pH reversed-phase chromatography with fraction concatenation as an alternative to strong-cation exchange chromatography for two-dimensional proteomic analysis", Expert Rev Proteomics, Apr. 2012, vol. 9, No. 2, pp. 129-134.

* cited by examiner

M Gilar et al, Anal Chem, 2005, 77, 6426-6434

NON-CONTIGUOUS SAMPLE FRACTIONATING AND CONCATENATING DEVICE AND DUAL ONLINE MULTIDIMENSIONAL LIQUID CHROMATOGRAPHY SYSTEM HAVING THE SAME

CROSS-REFERENCE TO RELATED APPLICATIONS

This application is a continuation of U.S. Ser. No. 16/070,100, filed Jul. 13, 2018, which is a § 371 national stage entry of International Application No. PCT/KR2016/012395, filed on Oct. 31, 2016, which claims priority to South Korean Patent Application No. 10-2016-0005394, filed on Jan. 15, 2016, the entire contents of which are incorporated herein by reference.

TECHNICAL FIELD

The present disclosure relates to a non-contiguous sample fractionating and concatenating device and a dual online multidimensional liquid chromatography system having the same, and more particularly, a non-contiguous sample fractionating and concatenating device and a dual online multidimensional liquid chromatography system having the same to achieve low sample complexity and high fraction uniformity.

BACKGROUND ART

In proteomics that is the large-scale study of the entire set of proteins expressed in human body under a specific condition, a combination of liquid chromatography system combined with mass spectrometry (LC-MS/MS) has emerged as very important technology.

In such technology, bottom-up or shotgun proteomics technique involving hydrolysis of proteins into small fragments, peptides, prior to analysis is widely used.

The bottom-up or shotgun proteomics method was proved to be useful, but inevitably results in sample complexity. For example, when proteins expressed from about 20,000 genomes are hydrolyzed into peptides, tens of millions peptides are obtained. Moreover, proteins in human body have a broad range of concentration dynamic ranges ($10^{10}$). Accordingly, to conduct effective proteomic analysis with reduced sample complexity, a separation method with high resolution is needed.

As technique for dealing with this problem, there is two-dimensional liquid chromatography technique. The technique embraces concatenation of two different separation methods.

There are two crucial factors for success in two-dimensional liquid chromatography; the first is separation efficiency of each separation method, and the second is separation orthogonality.

The separation orthogonality refers to independency of each separation modes, which means that sample mixtures are separated by different physiochemical properties by each separation mode.

One of two-dimensional separation methods that have been developed and widely used in recent years is a method including fractionating a sample according to the degree of hydrophobicity at alkaline pH and separating the separated fractions again according to the degree of hydrophobicity under acidic pH condition (two-dimensional reversed-phase liquid chromatography-reversed-phase liquid chromatography, 2D RP-RPLC).

Basically, two separation modes that separate the mixture by hydrophobicity does not have separation orthogonality, but peptides under different pH conditions have different charge distributions depending on unique amino acid composition, and accordingly, even the same peptide can have different degrees of hydrophobicity. Due to this, the 2D RP-RPLC method has separation orthogonality.

However, the 2D RP-RPLC method does not have complete separation orthogonality. FIG. 1 shows a distribution of identified peptides at the elution time of each separation method after RPLC separation at pH 10, RPLC separation of each fraction at pH2.6 again and analysis using a mass analyzer. Seeing FIG. 1, it is observed that there are many areas where peptides are not found, which implies that the 2D RP-RPLC method did not exploit all separation spaces of two-dimensional separation.

A method developed to solve this problem is non-contiguous concatenation after fractionation. Referring to FIG. 2A, the non-contiguous concatenation after fractionation includes fractionation into 96 ($1^{st}$ to $96^{th}$) in the order of elution of the first dimension RLPC separation under alkaline pH and non-contiguous concatenation into 24 fractions. after Nos. 1 to 24 become 24 fractions, No. 25 is concatenated into the first fraction and No. 26 is concatenated into the second fraction. As a result, Nos. 1, 25, 49 and 73 fractions are concatenated into the first fraction, Nos. 2, 26, 50 and 74 are concatenated into the second fraction, and Nos. 24, 48, 72 and 96 are concatenated into the last 24th fraction. When non-contiguous concatenation is performed in this way, the entire separation space of two-dimensional separation can be fully utilized as shown in FIG. 2B.

By using the fractionation and non-contiguous concatenation technology, 2D RP-RPLC achieved high separation orthogonality.

However, this concatenation process is performed manually by researchers, requiring large amounts of manpower and time. Additionally, to perform an LC-MS/MS experiment at acidic pH for fractions obtained in the off-line method, many manual steps are needed to reduce the volume of the fractions and dissolve in a solvent applicable for the LC-MS/MS experiment again, causing a sample loss during this process and affecting reproducibility of the experiment. Accordingly, there is a demand for the development of a liquid chromatography system to automatically perform the steps subsequent to sample injection.

RELATED LITERATURES

Non-Patent Literatures

Non-Patent Literature 1: M Gilar et al, Anal Chem, 2005, 77, 6426-6434

Non-Patent Literature 2: J. M. Park et al, Sci. Rep. 5, 18189; doi:10.1038/srep18189 (2015)

DISCLOSURE

Technical Problem

Therefore, the present disclosure is directed to providing a non-contiguous sample fractionating and concatenating device and a dual online multidimensional liquid chromatography system having the same for improving reproducibility of fractionation and preventing a sample loss through automation of non-contiguous sample fractionation and concatenation process with low sample complexity and high fraction uniformity.

Technical Solution

According to an aspect of the present disclosure, there is provided a non-contiguous sample fractionating and concatenating device including a sample supply module which supplies a sample to be analyzed, and a sample fractionation module connected to the sample supply module, and which is continuously supplied with the sample, sets a plurality of unit sample supply times obtained by equally dividing a total sample supply time during which the sample is supplied from the sample supply module, sets a plurality of unit fractionation intervals obtained by equally dividing each of the plurality of unit sample supply times, and concatenates and stores the sample supplied during corresponding unit fractionation intervals within each unit sample supply time to acquire a plurality of fractions.

The sample fractionation module may include a first fractionation valve connected to the sample supply module, into which the sample is introduced, a second fractionation valve provided adjacent to the first fractionation valve, and a plurality of fraction storage loops provided corresponding to a number of the plurality of unit fractionation intervals within the unit sample supply time, each having one end connected to the first fractionation valve and the other end connected to the second fractionation valve, to concatenate and store the sample supplied during the corresponding unit fractionation intervals within each of the unit sample supply times in a sequential order.

The first fractionation valve may include a fraction inlet port through which the sample is introduced from the sample supply module, a plurality of first fraction storage loop connection ports provided adjacent to the fraction inlet port, each connected to one end of the plurality of fraction storage loops, and a first connecting channel connecting the fraction inlet port and one of the plurality of first fraction storage loop connection ports in communication with each other corresponding to the unit fractionation interval, and the second fractionation valve may include a plurality of second fraction storage loop connection ports to which the other end of the plurality of fraction storage loops is each connected, a fraction outlet port provided adjacent to the plurality of second fraction storage loop connection ports, and connected to the other end of one of the plurality of fraction storage loops to discharge the fraction, and a second connecting channel connecting the fraction outlet port and one of the plurality of second fraction storage loop connection ports in communication with each other corresponding to the unit fractionation interval.

The sample supply module may include a first sample supply valve to which a first pump and a sample injector are connected, wherein the first pump supplies a first solvent, and a second sample supply valve connected to the first sample supply valve to receive the sample supplied from the first sample supply valve and supply the sample to the fraction inlet port.

The first sample supply valve may include a first sample inlet port connected to the sample injector, a first sample outlet port provided adjacent to the first sample inlet port, a first solvent inlet port connected to the first pump, a first solvent outlet port provided adjacent to the first solvent inlet port and connected to the second sample supply valve, and a first sample storage loop connection port and a second sample storage loop connection port to which two ends of a sample storage loop are each connected, and in a state that the first sample storage loop connection port and the second sample storage loop connection port are each connected to the first sample inlet port and the first sample outlet port, the sample may be stored in the sample storage loop, and in a state that the first sample storage loop connection port and the second sample storage loop connection port are each connected to the first solvent inlet port and the first solvent outlet port, the first solvent may be injected into the sample storage loop to supply the sample to the second sample supply valve.

The second sample supply valve may include a second sample inlet port connected to the first solvent outlet port, a second sample outlet port provided adjacent to the second sample inlet port and connected to the fraction inlet port, and a sample separation column having two ends, each connected to the second sample inlet port and the second sample outlet port, so that the sample is eluted at the second sample outlet port, and the sample eluted in the sample separation column may be supplied to the fraction inlet port.

According to another aspect of the present disclosure, there is provided a dual online multidimensional liquid chromatography system including a non-contiguous sample fractionating and concatenating device which is continuously supplied with a sample to be analyzed, sets a plurality of unit sample supply times obtained by equally dividing a total sample supply time during which the sample is supplied, sets a plurality of unit fractionation intervals obtained by equally dividing each of the plurality of unit sample supply times, and supplies a plurality of fractions acquired by concatenating and storing the sample supplied during corresponding unit fractionation intervals within each unit sample supply time, a dual column valve to which a first reversed-phase liquid chromatography column and a second reversed-phase liquid chromatography column are connected, and having a first solid phase extraction column connected to the first reversed-phase liquid chromatography column and a second solid phase extraction column connected to the second reversed-phase liquid chromatography column, and a column selection module provided between the non-contiguous sample fractionating and concatenating device and the dual column valve to supply the fractions supplied from the non-contiguous sample fractionating and concatenating device in a sequential order to the first solid phase extraction column and the first reversed-phase liquid chromatography column or the second solid phase extraction column and the second reversed-phase liquid chromatography column in alternating manner.

The non-contiguous sample fractionating and concatenating device may include a sample supply module which supplies the sample, and a sample fractionation module connected to the sample supply module to continuously receive the sample supplied from the sample supply module to acquire a plurality of fractions and supply the plurality of fractions to the column selection module in a sequential order.

The sample fractionation module may include a first fractionation valve connected to the sample supply module, into which the sample is introduced, a second fractionation valve provided adjacent to the first fractionation valve, and a plurality of fraction storage loops provided corresponding to a number of the plurality of unit fractionation intervals within the unit sample supply time, each having one end connected to the first fractionation valve and the other end connected to the second fractionation valve, to concatenate and store the sample supplied during the corresponding unit fractionation intervals within each of the unit sample supply times in a sequential order.

The first fractionation valve may include a first fraction inlet port through which the sample is introduced from the sample supply module, a plurality of first fraction storage loop connection ports provided adjacent to the first fraction inlet port, to which one end of the plurality of fraction storage loops is each connected, and a first connecting channel connecting the fraction inlet port and one of the plurality of first fraction storage loop connection ports in communication with each other corresponding to the unit fractionation interval, and the second fractionation valve may include a plurality of second fraction storage loop connection ports to which the other end of the plurality of fraction storage loops is each connected, a first fraction outlet port provided adjacent to the plurality of second fraction storage loop connection ports, the first fraction outlet port to which the other end of one of the plurality of fraction storage loops is connected to discharge the fraction, and a second connecting channel connecting the first fraction outlet port and one of the plurality of second fraction storage loop connection ports in communication with each other corresponding to the unit fractionation interval.

The sample supply module may include a first sample supply valve having a first sample inlet port connected to a sample injector, a first sample outlet port provided adjacent to the first sample inlet port, a first solvent inlet port connected to a first pump, a first solvent outlet port provided adjacent to the first solvent inlet port, and a first sample storage loop connection port and a second sample storage loop connection port to which two ends of a sample storage loop are each connected, and a second sample supply valve having a second sample inlet port connected to the first solvent outlet port, a second sample outlet port provided adjacent to the second sample inlet port and connected to the first fraction inlet port, and a sample separation column having two ends, each connected to the second sample inlet port and the second sample outlet port, so that the sample is eluted at the second sample outlet port.

The column selection module may include a column equilibration valve connected to the first fraction outlet port to provide a channel through which the plurality of fractions is supplied to the first solid phase extraction column or the second solid phase extraction column in alternating manner, and to equilibrate the first solid phase extraction column and the first reversed-phase liquid chromatography column or the second solid phase extraction column and the second reversed-phase liquid chromatography column in alternating manner, and a column selection valve connected to the column equilibration valve to receive the supply of the plurality of fractions and supply the plurality of fractions to the first solid phase extraction column or the second solid phase extraction column in alternating manner, so that the fraction is eluted with the first reversed-phase liquid chromatography column in the first solid phase extraction column or the second reversed-phase liquid chromatography column in the second solid phase extraction column.

The column equilibration valve may include a second fraction inlet port connected to the first fraction outlet port and a second pump which supplies a second solvent, a third solvent inlet port connected to a third pump which supplies a third solvent, through which the third solvent is introduced, a second fraction outlet port provided adjacent to the second fraction inlet port and selectively connected to the second fraction inlet port and the third solvent inlet port, and a third solvent outlet port provided adjacent to the third solvent inlet port and selectively connected to the second fraction inlet port and the third solvent inlet port, and in a state that the second fraction inlet port and the third solvent outlet port are connected, the fraction into which the second solvent is injected may be supplied to the first solid phase extraction column or the second solid phase extraction column via the column selection valve, and in a state that the third solvent inlet port and the third solvent outlet port are connected, the third solvent may equilibrate the first solid phase extraction column and the first reversed-phase liquid chromatography column or the second solid phase extraction column and the second reversed-phase liquid chromatography column in alternating manner via the column selection valve.

The column selection valve may include a fraction and third solvent inlet port connected to the third solvent outlet port, through which the fraction or the third solvent is introduced, a fourth solvent inlet port connected to a fourth pump which supplies a fourth solvent, through which the fourth solvent is introduced, a fraction and third solvent outlet port provided adjacent to the fraction and third solvent inlet port and selectively connected to the fraction and third solvent inlet port and the fourth solvent inlet port, and a fourth solvent outlet port provided adjacent to the fourth solvent inlet port and selectively connected to the fraction and third solvent inlet port and the fourth solvent inlet port, and as the fraction and third solvent inlet port and the fraction and third solvent outlet port are connected, the fraction may be supplied to the first solid phase extraction column, and then in a state that the fourth solvent inlet port and the fraction and third solvent outlet port are connected, the fourth solvent may elute the fraction with the first reversed-phase liquid chromatography column in the first solid phase extraction column, and in a state that the fraction and third solvent inlet port and the fourth solvent outlet port are connected, the third solvent may equilibrate the second solid phase extraction column and the second reversed-phase liquid chromatography column, and as the fraction and third solvent inlet port and the fourth solvent outlet port are connected, the fraction may be supplied to the second solid phase extraction column, and then in a state that the fourth solvent inlet port and the fourth solvent outlet port are connected, the fourth solvent may elute the fraction with the second reversed-phase liquid chromatography column in the second solid phase extraction column, and in a state that the fraction and third solvent inlet port and the fraction and third solvent outlet port are connected, the third solvent may equilibrate the first solid phase extraction column and the first reversed-phase liquid chromatography column.

The dual column valve may include a first solid phase extraction column connection port and a first solid phase extraction column channel port, each connected to two ends of the first solid phase extraction column, a first solid phase extraction column inlet port connected to the fraction and third solvent outlet port, and selectively connected to the first solid phase extraction column connection port and the first solid phase extraction column channel port, a first reversed-phase liquid chromatography column port connected to the first reversed-phase liquid chromatography column, and connected or disconnected to/from the first solid phase extraction column connection port, a second solid phase extraction column connection port and a second solid phase extraction column channel port, each connected to two ends of the second solid phase extraction column, a second solid phase extraction column inlet port connected to the fourth solvent outlet port, and selectively connected to the second solid phase extraction column connection port and the second solid phase extraction column channel port, and a second reversed-phase liquid chromatography column port connected to the second reversed-phase liquid chromatography column, and connected or disconnected to/from the second solid phase extraction column connection port.

The dual column valve may further include a first outlet port provided adjacent to the first solid phase extraction column channel port, and connected or disconnected to/from the first solid phase extraction column channel port, and a second outlet port provided adjacent to the first outlet port, and connected or disconnected to/from the second solid phase extraction column channel port.

Advantageous Effects

The embodiment of the present disclosure is provided with a non-contiguous sample fractionating and concatenating device which concatenates and stores a sample supplied during corresponding unit fractionation intervals within each unit sample supply time to automatically acquire a plurality of fractions, thereby reducing sample complexity and increasing fraction uniformity, and further, improving reproducibility of fractionation and preventing a sample loss.

BEST MODE

Figure 1:
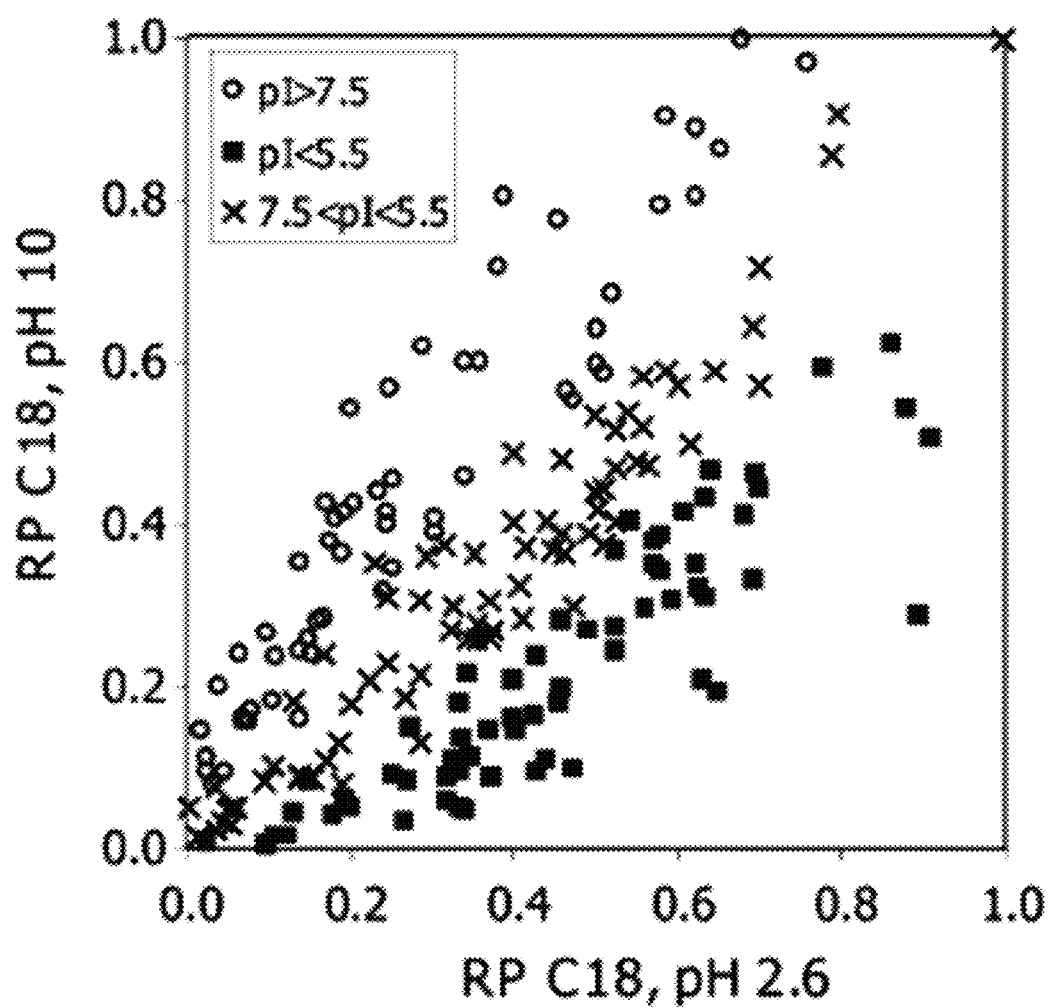
FIG. 1 is a diagram showing a distribution of identified peptides after RPLC separation at pH 10, RPLC separation of each fraction at pH2.6 again and analysis using a mass analyzer.
Figure 2:
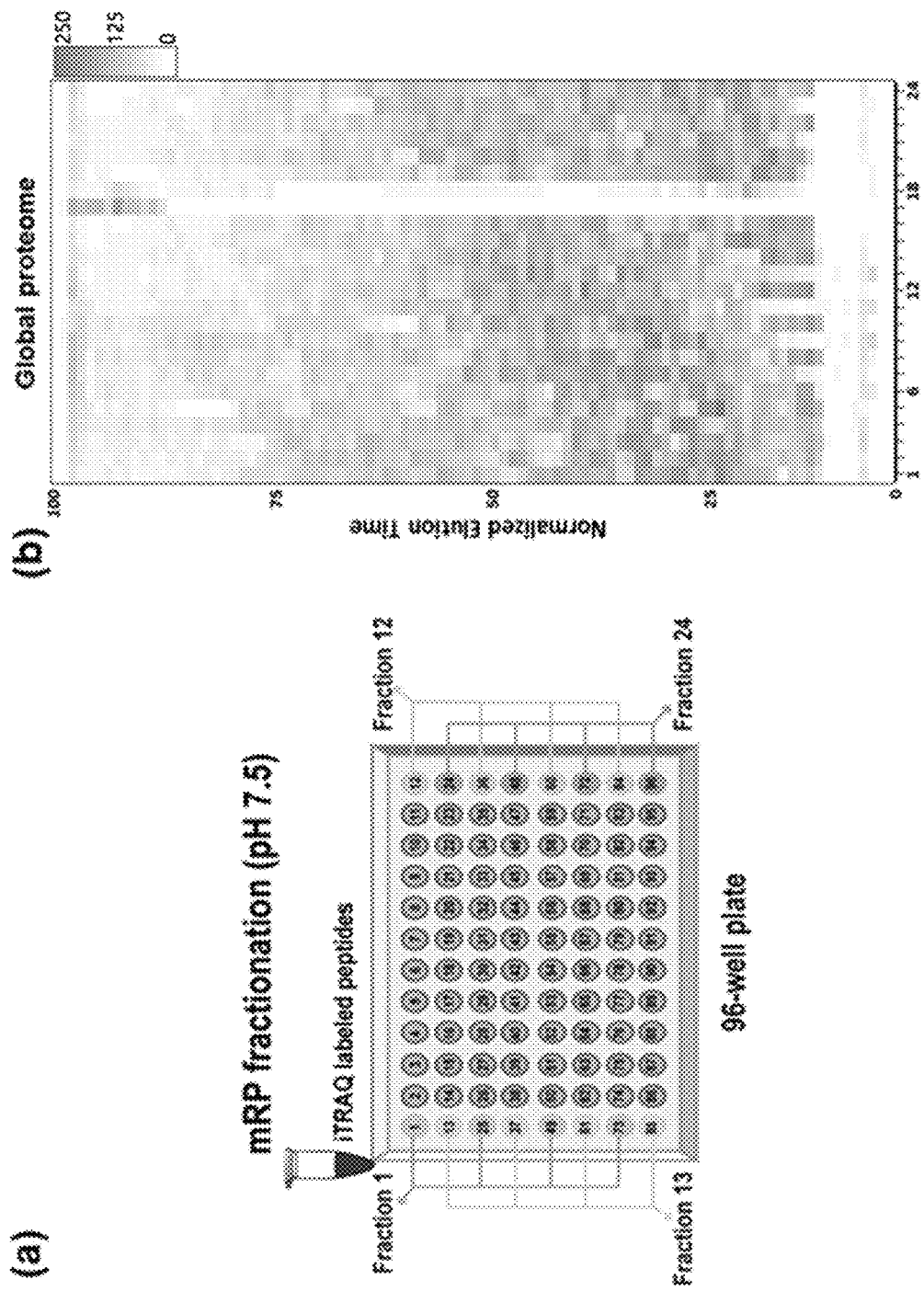
FIG. 2 is a diagram illustrating non-contiguous concatenation after sample fractionation.

For a complete understanding of the present disclosure, its operational advantages and objects achieved by the practice of the present disclosure, a reference is made to the accompanying drawings illustrating the preferred embodiments of the present disclosure and the statements in the drawings.

Hereinafter, the present disclosure will be described in detail by delineating the preferred embodiments of the present disclosure with reference to the accompanying drawings. Like reference symbols presented in each drawing indicate like elements.

Figure 3:
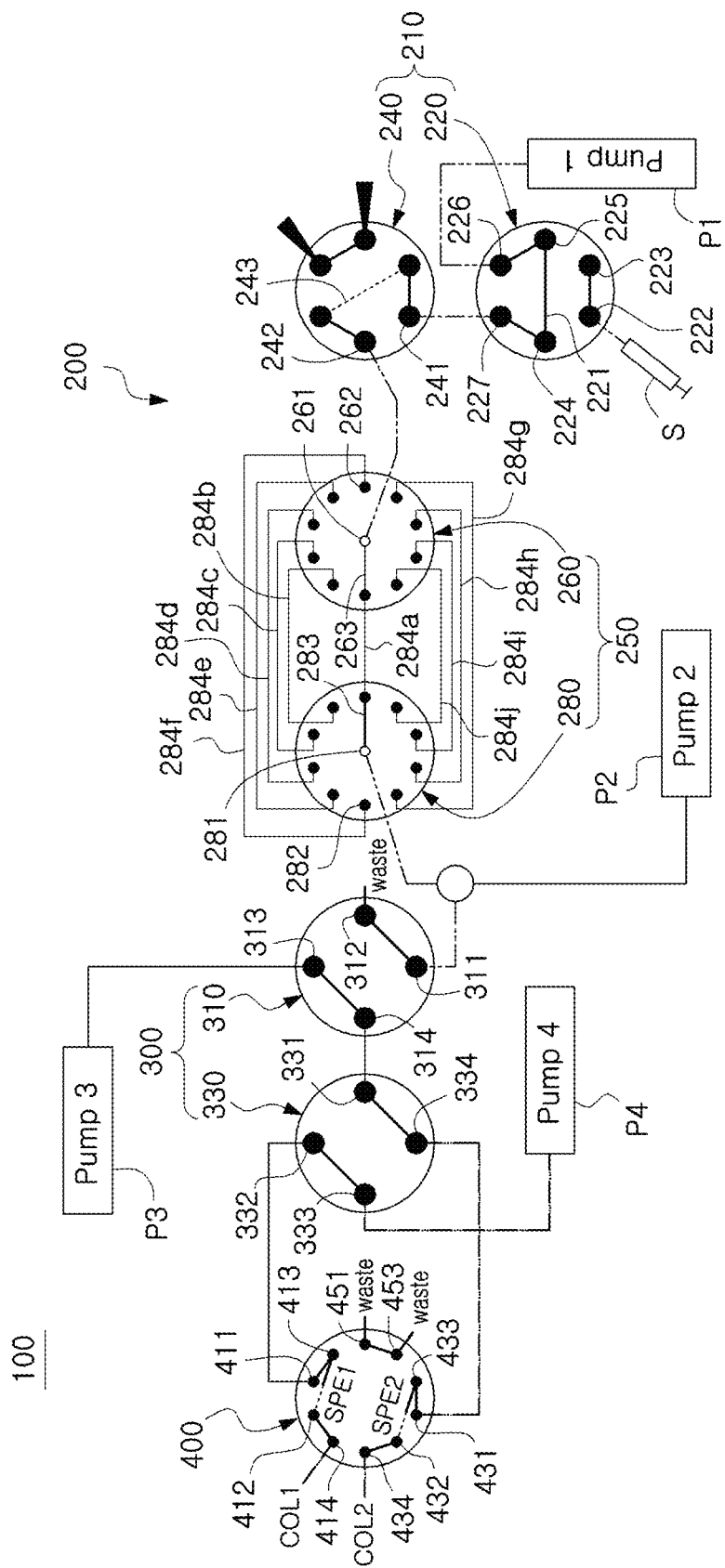
FIG. 3 is a diagram showing an operation of acquiring a first fraction by a dual online multidimensional liquid chromatography system according to an embodiment of the present disclosure.
Figure 4:
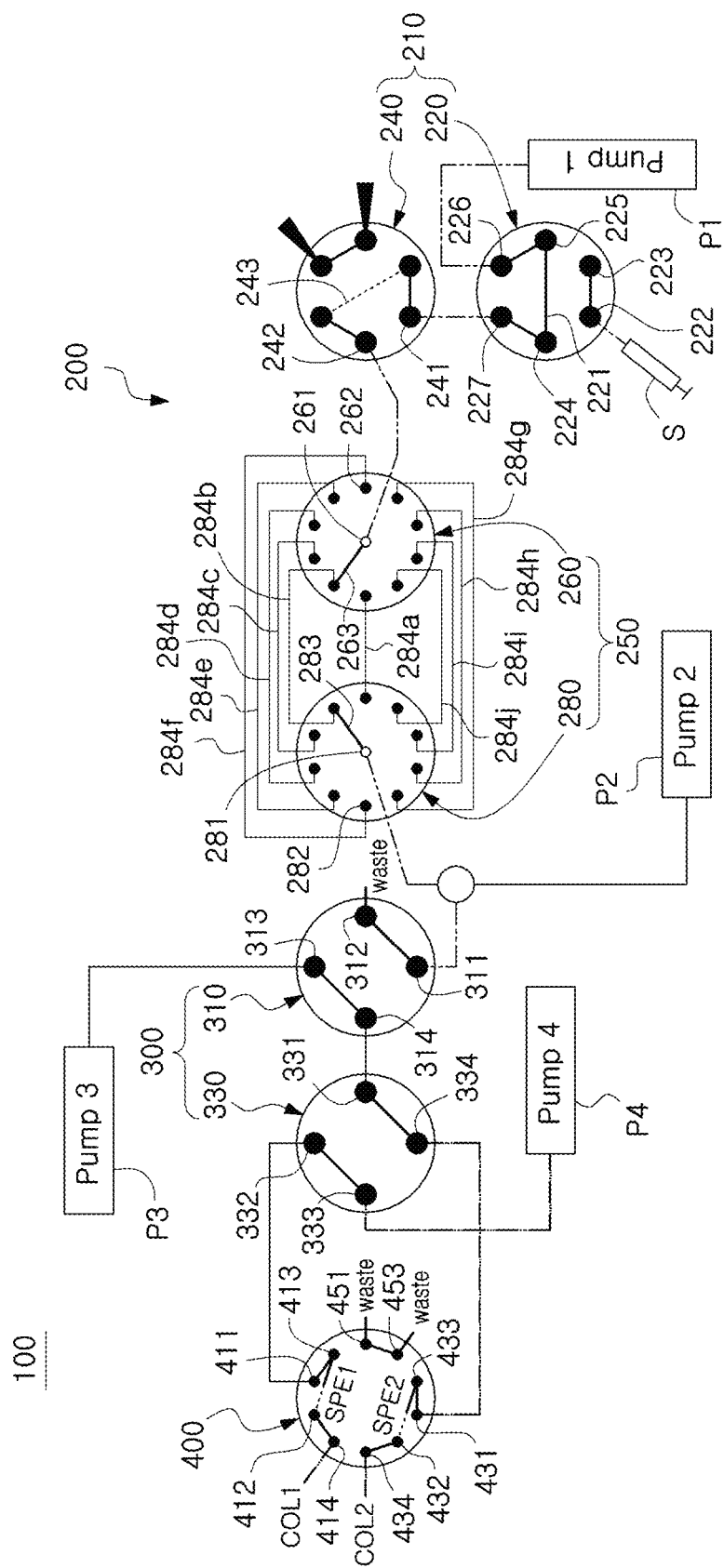
FIG. 4 is a diagram showing an operation of acquiring a second fraction by a dual online multidimensional liquid chromatography system according to an embodiment of the present disclosure.
Figure 5:
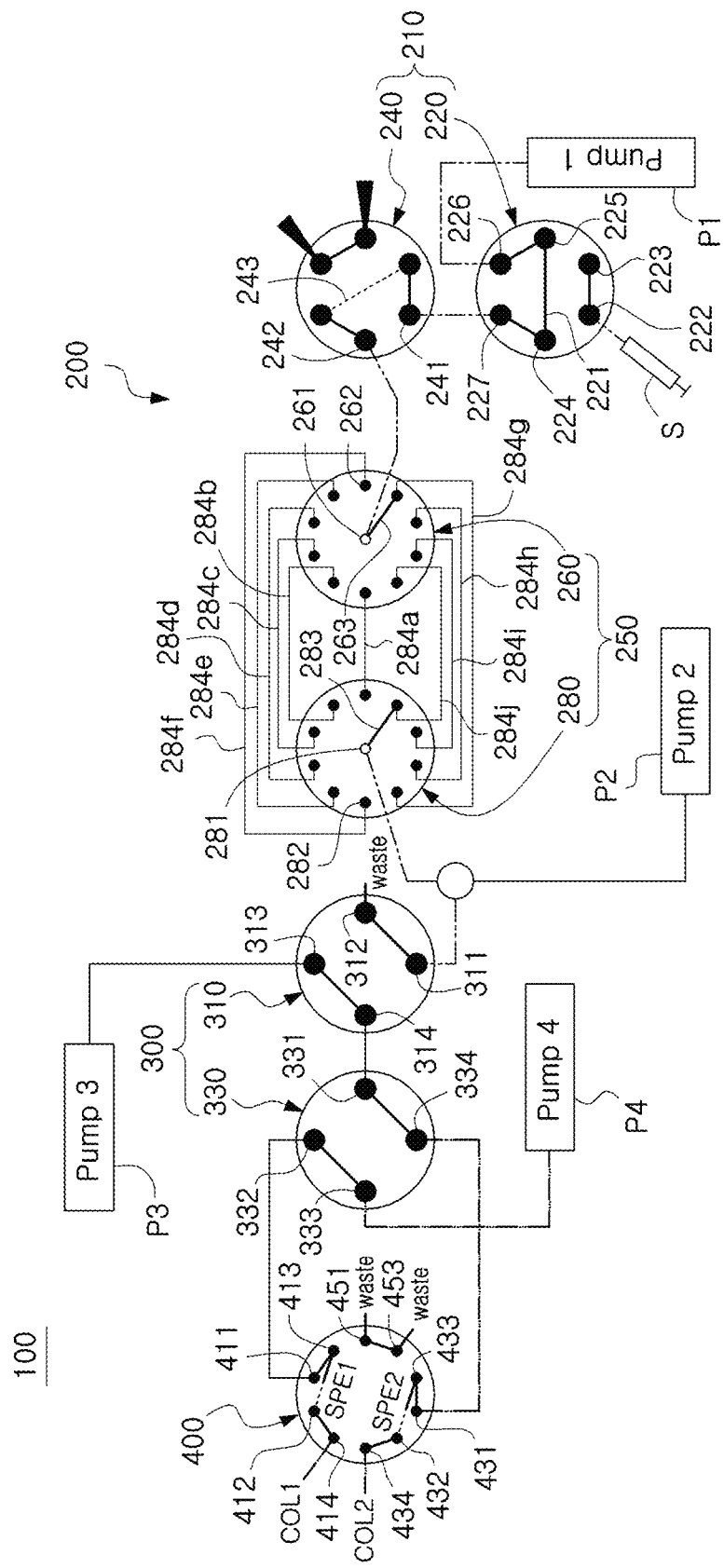
FIG. 5 is a diagram showing an operation of acquiring a tenth fraction by a dual online multidimensional liquid chromatography system according to an embodiment of the present disclosure.
Figure 6:
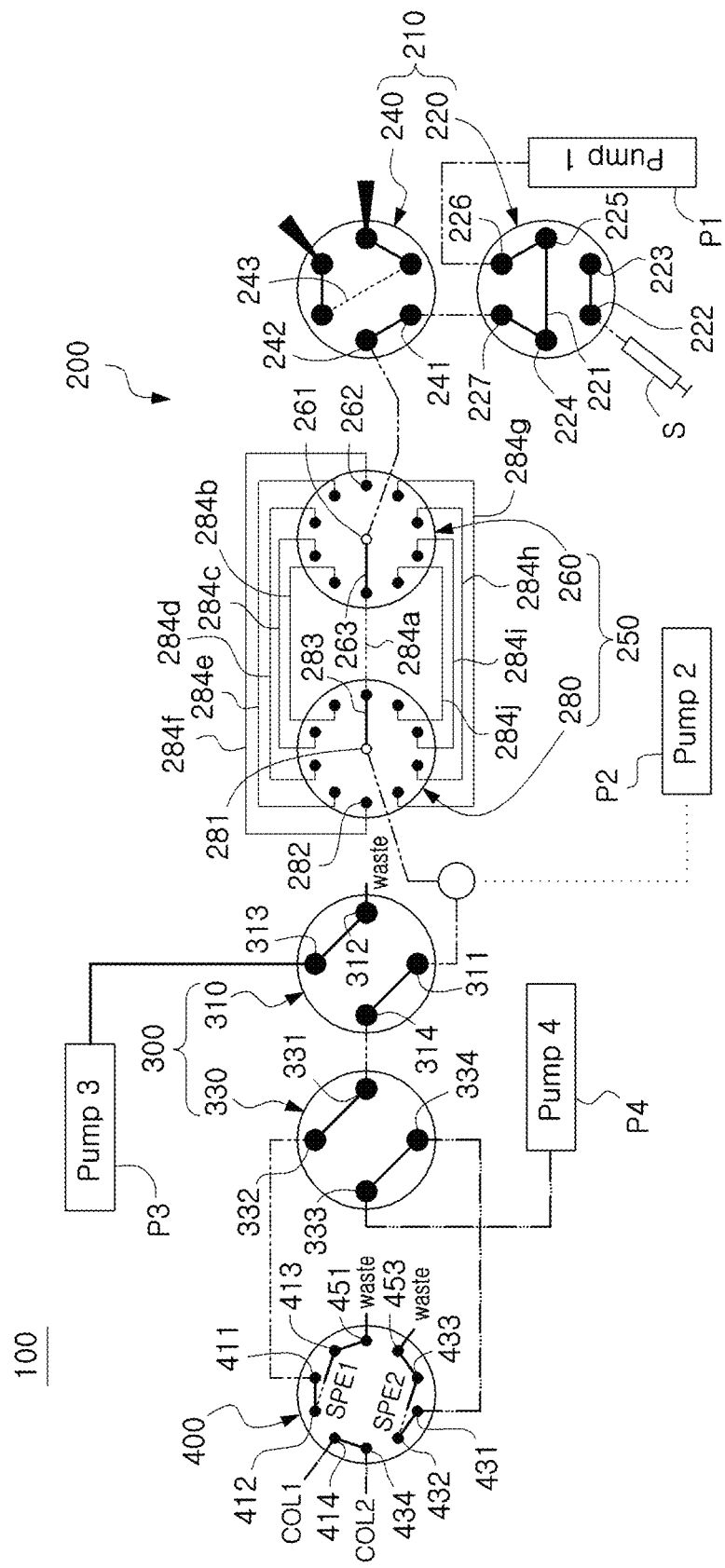
FIG. 6 is a diagram showing an operation of supplying a first fraction to a first solid phase extraction column by a dual online multidimensional liquid chromatography system according to an embodiment of the present disclosure.
Figure 7:
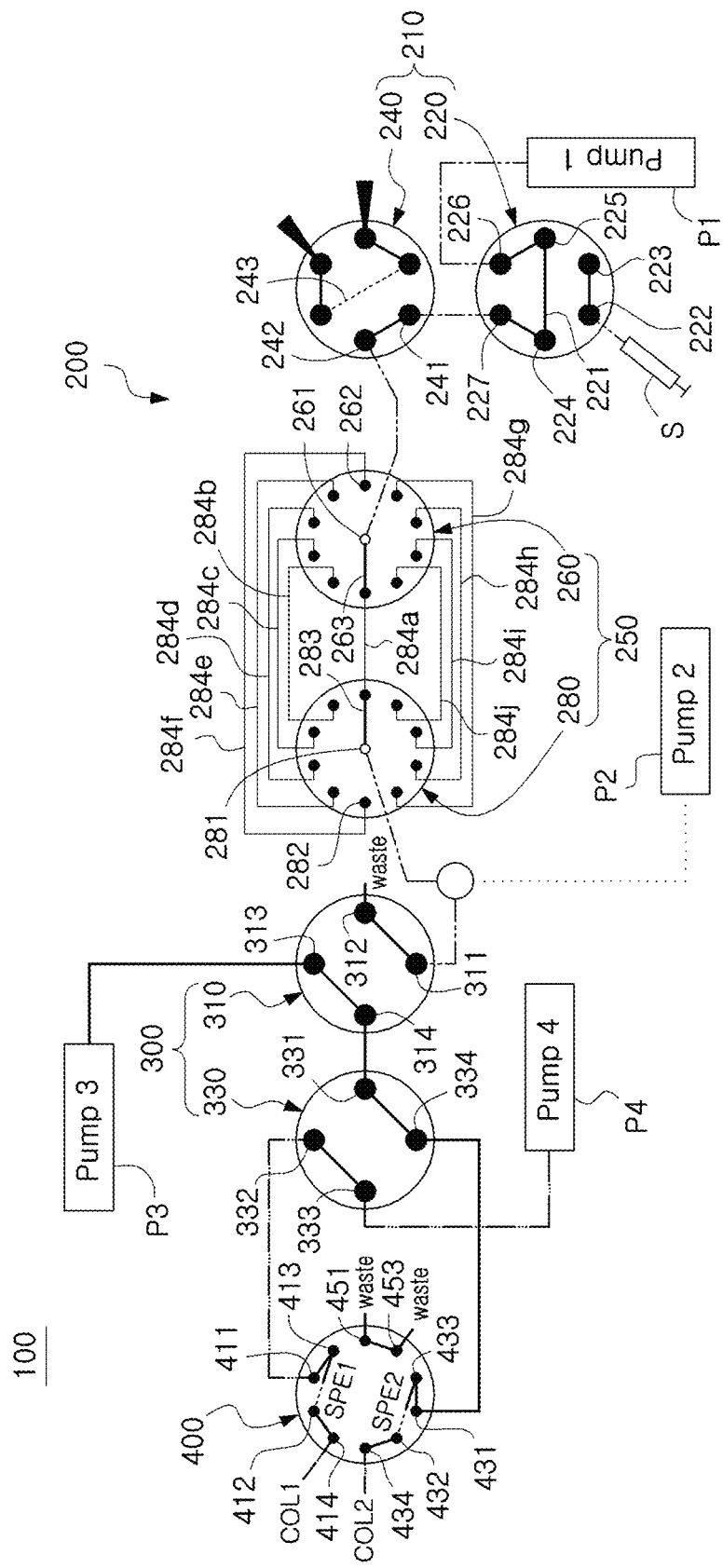
FIG. 7 is a diagram showing an operation of supplying a first fraction to a first reversed-phase liquid chromatography column and equilibrating a second solid phase extraction column and a second reversed-phase liquid chromatography column by a dual online multidimensional liquid chromatography system according to an embodiment of the present disclosure.
Figure 8:
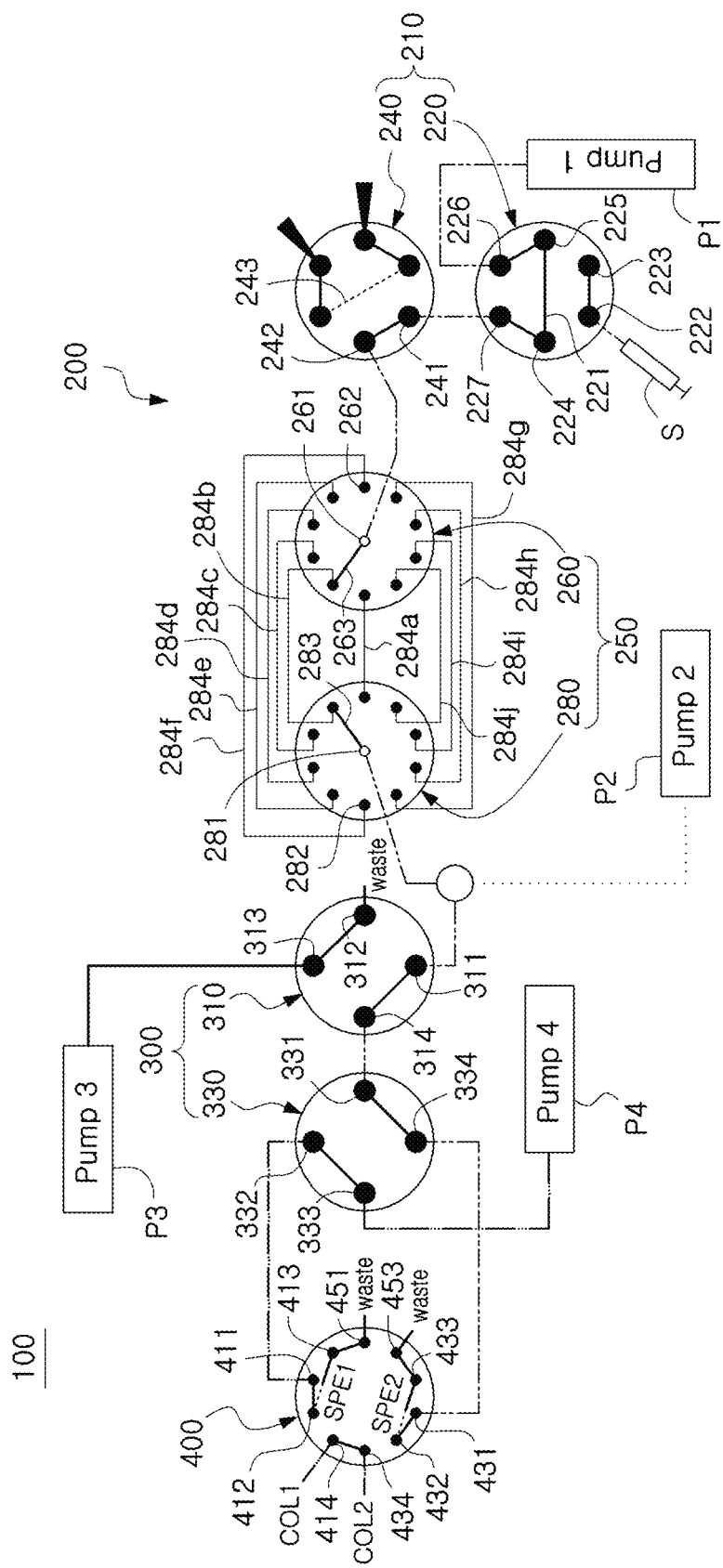
FIG. 8 is a diagram showing an operation of supplying a second fraction to a second solid phase extraction column by a dual online multidimensional liquid chromatography system according to an embodiment of the present disclosure.
Figure 9:
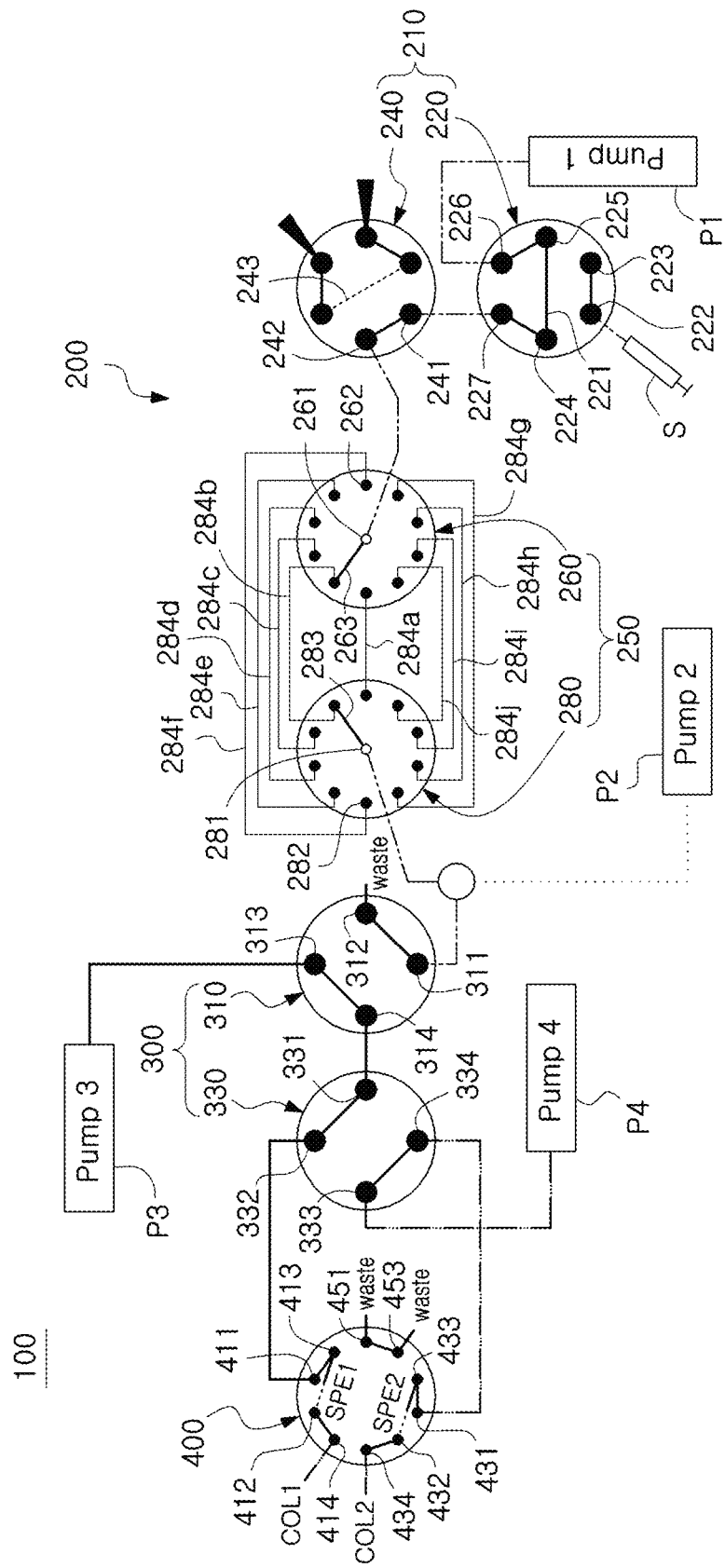
FIG. 9 is a diagram showing an operation of supplying a second fraction to a second reversed-phase liquid chromatography column and equilibrating a first solid phase extraction column and a first reversed-phase liquid chromatography column by a dual online multidimensional liquid chromatography system according to an embodiment of the present disclosure.

FIG. 3 is a diagram showing an operation of acquiring a first fraction by a dual online multidimensional liquid chromatography system according to an embodiment of the present disclosure, FIG. 4 is a diagram showing an operation of acquiring a second fraction by the dual online multidimensional liquid chromatography system according to an embodiment of the present disclosure, FIG. 5 is a diagram showing an operation of acquiring a tenth fraction by the dual online multidimensional liquid chromatography system according to an embodiment of the present disclosure, FIG. 6 is a diagram showing an operation of supplying the first fraction to a first solid phase extraction column by the dual online multidimensional liquid chromatography system according to an embodiment of the present disclosure, FIG. 7 is a diagram showing an operation of supplying the first fraction to a first reversed-phase liquid chromatography column and equilibrating a second solid phase extraction column and a second reversed-phase liquid chromatography column by the dual online multidimensional liquid chromatography system according to an embodiment of the present disclosure, FIG. 8 is a diagram showing an operation of supplying a second fraction to the second solid phase extraction column by the dual online multidimensional liquid chromatography system according to an embodiment of the present disclosure, and FIG. 9 is a diagram showing an operation of supplying the second fraction to the second reversed-phase liquid chromatography column and equilibrating the first solid phase extraction column and the first reversed-phase liquid chromatography column by the dual online multidimensional liquid chromatography system according to an embodiment of the present disclosure.

Referring to FIGS. 3 to 5, the dual online multidimensional liquid chromatography system 100 according to an embodiment of the present disclosure includes a non-contiguous sample fractionating and concatenating device 200 which is continuously supplied with a sample to be analyzed to acquire a plurality of fractions and supplies the plurality of fractions, a dual column valve 400 to which a first reversed-phase liquid chromatography column (COL1) and a second reversed-phase liquid chromatography column (COL2) are connected and having a first solid phase extraction column (SPE1) connected to the first reversed-phase liquid chromatography column (COL1) and a second solid phase extraction column (SPE2) connected to the second reversed-phase liquid chromatography column (COL2), and a column selection module 300 provided between the non-contiguous sample fractionating and concatenating device 200 and the dual column valve 400 to supply the plurality of fractions supplied from the non-contiguous sample fractionating and concatenating device 200 in a sequential order to the first solid phase extraction column (SPE1) and the first reversed-phase liquid chromatography column (COL1) or the second solid phase extraction column (SPE2) and the second reversed-phase liquid chromatography column (COL2) in alternating manner.

Referring to FIGS. 3 to 5, the non-contiguous sample fractionating and concatenating device 200 according to this embodiment plays a role in acquiring the plurality of fractions from the sample continuously supplied from a sample injector S.

The plurality of fractions according to this embodiment will be described below.

First, unit sample supply times are set by equally dividing the total sample supply time during which the sample is supplied. Additionally, unit fractionation intervals are set by equally dividing each unit sample supply time. Additionally, the plurality of fractions is acquired by concatenating and storing the sample supplied during corresponding unit fractionation intervals within each unit sample supply time.

For example, when the total sample supply time is 100 minutes, the unit sample supply times obtained by equally dividing the total sample supply time into five are at an interval of 20 minutes. That is, the first unit sample supply time corresponds to 0-20 minutes, and the second to fifth unit sample supply times correspond to 20-40 minutes, 40-60 minutes, 60-80 minutes, and 80-100 minutes, respectively.

Additionally, the first to fifth unit sample supply times may have unit fractionation intervals obtained by equally dividing into ten. For example, during the first unit sample supply time, a first unit fractionation interval corresponds to 0-2 minutes, and second to tenth unit fractionation intervals correspond to 2-4 minutes, 4-6 minutes, 6-8 minutes, 8-10 minutes, 10-12 minutes, 12-14 minutes, 14-16 minutes, 16-18 minutes and 18-20 minutes, respectively. Additionally, during the second sample supply time, a first unit fractionation interval corresponds to 20-22 minutes, and second to tenth fractionation intervals correspond to 22-24 minutes, 24-26 minutes, 26-28 minutes, 28-30 minutes, 30-32 minutes, 32-34 minutes, 34-36 minutes, 36-38 minutes and 38-40 minutes, respectively.

In this embodiment, the plurality of fractions are acquired by concatenating and storing the sample supplied during the corresponding first to tenth unit fractionation intervals within the first to fifth unit sample supply times. For example, the first fraction is acquired by concatenating and storing the sample supplied during the first unit fractionation intervals within the first to fifth unit sample supply times (i.e., 0-2 minutes, 20-22 minutes, 40-42 minutes, 60-62 minutes, 80-82 minutes). The second to tenth fractions are obtained by the same operation as the operation of acquiring the first fraction, and its detailed description is omitted herein.

Additionally, although this embodiment sets the total sample supply time of 100 minutes and the first to fifth unit sample supply times, and sets ten unit fractionation intervals in each unit sample supply time, the scope of protection of the present disclosure is not limited thereto, and the total sample supply time, the unit sample supply time and the unit fractionation interval may be variously set.

The non-contiguous sample fractionating and concatenating device 200 according to this embodiment includes a sample supply module 210 which supplies a sample, and a sample fractionation module 250 connected to the sample supply module 210 to continuously receive the sample supplied from the sample supply module 210 to acquire a plurality of fractions and supply the plurality of fractions to the column selection module 300 in a sequential order.

The sample supply module 210 according to this embodiment plays a role in continuously supplying the sample to the sample fractionation module 250.

The sample supply module 210 includes a first sample supply valve 220 to which a first pump P1 that supplies a first solvent and a sample injector S are connected, and a second sample supply valve 240 connected to the first sample supply valve 220 to receive the sample supplied from the first sample supply valve 220 and supply the sample to the sample fractionation module 250.

The first sample supply valve 220 plays a role in receiving the sample supplied from the sample injector S, storing the sample in a sample storage loop 221, and then receiving the first solvent supplied from the first pump P1 and supplying the sample stored in the sample storage loop 221 to the second sample supply valve 240.

To this end, the first sample supply valve 220 includes a first sample inlet port 222 connected to the sample injector S, a first sample outlet port 223 provided adjacent to the first sample inlet port 222, a first solvent inlet port 226 connected to the first pump P1, a first solvent outlet port 227 provided adjacent to the first solvent inlet port 226 and connected to the second sample supply valve 240, and a first sample storage loop connection port 224 and a second sample storage loop connection port 225 to which two ends of the sample storage loop 221 are each connected.

Although not shown, in a state that the first sample storage loop connection port 224 and the second sample storage loop connection port 225 each connected to the two ends of the sample storage loop 221 are respectively connected to the first sample inlet port 222 and the first sample outlet port 223, the sample is supplied to the first sample inlet port 222 through the sample injector S and continuously stored in the sample storage loop 221.

Additionally, in a state that the first sample storage loop connection port 224 and the second sample storage loop connection port 225 are each connected to the first solvent inlet port 226 and the first solvent outlet port 227, the first solvent is injected into the first solvent inlet port 226 through the first pump P1 and the sample stored in the sample storage loop 221 is continuously supplied to the second sample supply valve 240. In this instance, the first pump P1 supplies the first solvent to the first solvent inlet port 226, wherein the first solvent is a mixed solution with pH 7.5 of 99% of solution A, 10 mM Triethylammonium bicarbonate (TEAB) in water, and 1% of solution B, 10 mM Triethylammonium bicarbonate (TEAB) in acetonitrile.

Additionally, the second sample supply valve 240 plays a role in continuously injecting the sample supplied from the first sample supply valve 220 into a sample separation column 243 and continuously supplying the sample injected into the sample separation column 243 to the sample fractionation module 250.

The second sample supply valve 240 includes a second sample inlet port 241 connected to the first solvent outlet port 227, a second sample outlet port 242 provided adjacent to the second sample inlet port 241 and connected to a first fraction inlet port 261, and a sample separation column 243 having two ends, each connected to the second sample inlet port 241 and the second sample outlet port 242, so that the sample is separated and eluted at the second sample outlet port 242.

The sample stored in the sample storage loop 221 is injected into the sample separation column 243 through the first solvent outlet port 227 and the second sample inlet port 241 by the first solvent. Additionally, the sample injected into the sample separation column 243 is separated and eluted by the first solvent supplied from the first pump P1 and supplied to the sample fractionation module 250 described below along the second sample outlet port 242. In this instance, the first pump P1 supplies the first solvent to the first solvent inlet port 226, wherein the first solvent is a mixed solution of the solution A, 10 mM Triethylammonium bicarbonate (TEAB) in water, reducing from 99% to 50% and the solution B, 10 mM Triethylammonium bicarbonate (TEAB) in acetonitrile, increasing from 1% to 50%. As above, the sample is easily eluted in the sample separation column 243 by gradually increasing the concentration of the solution B in the first solvent.

The sample fractionation module 250 according to this embodiment plays a role in acquiring ten fractions from the sample continuously supplied from the sample supply module 210.

The sample fractionation module 250 includes a first fractionation valve 260 connected to the sample supply module 210 to allow the sample to be introduced through, a second fractionation valve 280 provided adjacent to the first fractionation valve 260, and a plurality of fraction storage loops 284a to 284j having one end connected to the first fractionation valve 260 and the other end connected to the second fractionation valve 280.

In this embodiment, because each unit sample supply time has ten unit fractionation intervals, ten fraction storage loops 284a to 284j are provided corresponding to the number of corresponding unit fractionation intervals within the unit sample supply time.

Additionally, the first fractionation valve 260 includes a first fraction inlet port 261 through which the sample is introduced from the second sample outlet port 242, a plurality of first fraction storage loop connection ports 262 provided adjacent to the first fraction inlet port 261 and each connected to one end of the plurality of fraction storage loops 284a to 284j, and a first connecting channel 263 connecting the first fraction inlet port 261 and one of the plurality of first fraction storage loop connection ports 262 in communication with each other corresponding to the unit fractionation interval. In this embodiment, ten first fraction storage loop connection ports 262 are provided corresponding to the number of ten fraction storage loops 284a to 284j.

Additionally, the second fractionation valve 280 includes a plurality of second fraction storage loop connection ports 282 to which the other end of the plurality of fraction storage loops 284a to 284j is each connected, a first fraction outlet port 281 provided adjacent to the plurality of second fraction storage loop connection ports 282 and connected to the other end of one of the plurality of fraction storage loops 284a to 284j to discharge the fraction, and a second connecting channel 283 connecting the first fraction outlet port 281 to one of the plurality of second fraction storage loop connection ports 282 in communication with each other corresponding to the unit fractionation interval. In this embodiment, ten second fraction storage loop connection ports 282 are provided corresponding to the number of ten fraction storage loops 284a to 284j.

First, the operation of acquiring first to tenth fractions during the first to tenth unit fractionation intervals within the first unit sample supply time (0-20 minutes) will be described below.

As shown in FIG. 3, the operation of acquiring the first fraction during the first unit fractionation interval (0-2 minutes) is as below.

The first connecting channel 263 is connected to the first fraction storage loop connection port 262 connected to one end of the first fraction storage loop 284a among the plurality of first fraction storage loop connection ports 262, and the second connecting channel 283 is connected to the second fraction storage loop connection port 282 connected to the other end of the first fraction storage loop 284a among the plurality of second fraction storage loop connection ports 282.

Additionally, in a state that the first solvent outlet port 227 and the second sample inlet port 241 are connected, the first solvent is supplied from the first pump P1 to the sample separation column 243 so that the sample is separated and eluted in the sample separation column 243, and the sample separated and eluted in the sample separation column 243 is supplied to the first fraction storage loop 284a via the first fraction inlet port 261 through the second sample outlet port 242 and stored in the first fraction storage loop 284a.

Additionally, as shown in FIG. 4, the operation of acquiring the second fraction during the second unit fractionation interval (2-4 minutes) is as below.

The first connecting channel 263 is connected to the first fraction storage loop connection port 262 connected to one end of the second fraction storage loop 284b among the plurality of first fraction storage loop connection ports 262, and the second connecting channel 283 is connected to the second fraction storage loop connection port 282 connected to the other end of the second fraction storage loop 284b among the plurality of second fraction storage loop connection ports 282.

Additionally, in a state that the first solvent outlet port 227 and the second sample inlet port 241 are connected, the first solvent is supplied from the first pump P1 to the sample separation column 243 so that the sample is separated and eluted in the sample separation column 243, and the sample separated and eluted in the sample separation column 243 is supplied to the second fraction storage loop 284b via the first fraction inlet port 261 through the second sample outlet port 242 and stored in the second fraction storage loop 284b.

Additionally, as shown in FIG. 5, the operation of acquiring the tenth fraction during the tenth unit fractionation interval (18-20 minutes) is as below.

The first connecting channel 263 is connected to the first fraction storage loop connection port 262 connected to one end of the tenth fraction storage loop 284j among the plurality of first fraction storage loop connection ports 262, and the second connecting channel 283 is connected to the second fraction storage loop connection port 282 connected to the other end of the tenth fraction storage loop 284j among the plurality of second fraction storage loop connection ports 282.

Additionally, in a state that the first solvent outlet port 227 and the second sample inlet port 241 are connected, the first solvent is supplied from the first pump P1 to the sample separation column 243 so that the sample is separated and eluted in the sample separation column 243, and the sample separated and eluted in the sample separation column 243 is supplied to the tenth fraction storage loop 284j via the first fraction inlet port 261 through the second sample outlet port 242 and stored in the tenth fraction storage loop 284j.

Additionally, the first to tenth fractions may be acquired by iteratively performing the operation of acquiring the first to tenth fractions during the first to tenth unit fractionation intervals within the first unit sample supply time (0-20 minutes) among the second to fifth unit sample supply times (20-40 minutes, 40-60 minutes, 60-80 minutes, 80-100 minutes). For example, the first fraction is acquired by concatenating and storing the sample supplied during the first unit fractionation intervals (i.e., 0-2 minutes, 20-22 minutes, 40-42 minutes, 60-62 minutes, 80-82 minutes) within the first to fifth unit sample supply times.

Meanwhile, for separation and analysis of the first to tenth fractions acquired by the sample fractionation module 250, the first to tenth fractions are supplied to the first reversed-phase liquid chromatography column (COL1) or the second reversed-phase liquid chromatography column (COL2).

To this end, the column selection module 300 according to this embodiment plays a role in supplying the first to tenth fractions supplied from the sample fractionation module 250 in a sequential order to the first solid phase extraction column (SPE1) and the first reversed-phase liquid chromatography column (COL1) or the second solid phase extraction column (SPE2) and the second reversed-phase liquid chromatography column (COL2) provided in the dual column valve 400 described below in alternating manner.

Additionally, the column selection module 300 plays a role in supplying the first to tenth fractions to one of the first solid phase extraction column (SPE1) and the first reversed-phase liquid chromatography column (COL1) or the second solid phase extraction column (SPE2) and the second reversed-phase liquid chromatography column (COL2), and performing fraction separation and analysis, and at the same time, performing an equilibration operation on the other of the first solid phase extraction column (SPE1) and the first reversed-phase liquid chromatography column (COL1) or the second solid phase extraction column (SPE2) and the second reversed-phase liquid chromatography column (COL2).

The column selection module 300 includes a column equilibration valve 310 connected to the first fraction outlet port 281 to provide a channel through which the plurality of fractions are supplied to the first solid phase extraction column (SPE1) or the second solid phase extraction column (SPE2) in alternating manner, and to equilibrate the first solid phase extraction column (SPE1) and the first reversed-phase liquid chromatography column (COL1) or the second solid phase extraction column (SPE2) and the second reversed-phase liquid chromatography column (COL2) in alternating manner, and a column selection valve 330 connected to the column equilibration valve 310 to receive the supply of the plurality of fractions and supply the fractions to the first solid phase extraction column (SPE1) or the second solid phase extraction column (SPE2) in alternating manner so that the fraction is separated and eluted with the first reversed-phase liquid chromatography column (COL1) in the first solid phase extraction column (SPE1) or the second reversed-phase liquid chromatography column (COL2) in the second solid phase extraction column (SPE2).

The column equilibration valve 310 according to this embodiment plays a role in providing a channel through which the first to tenth fractions are supplied to the first solid phase extraction column (SPE1) or the second solid phase extraction column (SPE2) in alternating manner.

The column equilibration valve 310 includes a second fraction inlet port 311 connected to the first fraction outlet port 281 and a second pump P2 which supplies a second solvent, a third solvent inlet port 313 connected to a third pump P3 which supplies a third solvent to allow the third solvent to be introduced through, a second fraction outlet port 312 provided adjacent to the second fraction inlet port 311 and selectively connected to the second fraction inlet port 311 and the third solvent inlet port 313, and a third solvent outlet port 314 provided adjacent to the third solvent inlet port 313 and selectively connected to the second fraction inlet port 311 and the third solvent inlet port 313.

Referring to FIG. 6, in a state that the second fraction inlet port 311 is connected to the first fraction outlet port 281 and the second fraction inlet port 311 is connected to the third solvent outlet port 314, the first fraction stored in the first fraction storage loop 284a is supplied to the first solid phase extraction column (SPE1) of the dual selection valve described below. Additionally, referring to FIG. 8, in a state that the second fraction inlet port 311 is connected to the first fraction outlet port 281 and the second fraction inlet port 311 is connected to the third solvent outlet port 314, the second fraction stored in the second fraction storage loop 284b is supplied to the second solid phase extraction column (SPE2) of the dual section valve described below.

As above, the first to tenth fractions stored in the first to tenth fraction storage loops 284a to 284j may be supplied to the first solid phase extraction column (SPE1) or the second solid phase extraction column (SPE2) in alternating manner in a state that the first fraction outlet port 281, the second fraction inlet port 311 and the third solvent outlet port 314 are connected.

In this instance, the first to tenth fractions discharged from the first to tenth fraction storage loops 284a to 284j are supplied with the second solvent through the second pump P2 placed in a line connecting the first fraction outlet port 281 and the second fraction inlet port 311. Here, the second pump P2 supplies the second solvent, 0.2% Trifluoroacetic acid (TFA) in water. Additionally, the first pump P1 supplies the first solvent to the first solvent inlet port 226, wherein the first solvent is a mixed solution of 99% of solution A, 10 mM Triethylammonium bicarbonate (TEAB) in water, and 1% of solution B, 10 mM Triethylammonium bicarbonate (TEAB) in acetonitrile. Additionally, a ratio of amounts of the first solvent supplied from the first pump P1 and the second solvent supplied from the second pump P2 may be 1:9.

This is because the second solvent is injected into the first to tenth fractions supplied to the first solid phase extraction column (SPE1) or the second solid phase extraction column (SPE2) to dilute and acidize the first to tenth fractions, thereby preventing a loss of the first to tenth fractions in the first solid phase extraction column (SPE1) or the second solid phase extraction column (SPE2) and reducing the composition of the organic solvent.

Additionally, referring to FIGS. 7, in the course of the separation and analysis operation of the first fraction stored in the first reversed-phase liquid chromatography column (COL1), in a state that the third solvent inlet port 313 and the third solvent outlet port 314 are connected, the third solvent equilibrates the second solid phase extraction column (SPE2) and the second reversed-phase liquid chromatography column (COL2) via the column selection valve 330. Additionally, referring to FIG. 9, in the course of the separation and analysis operation of the second fraction stored in the second reversed-phase liquid chromatography column (COL2), in a state that the third solvent inlet port 313 and the third solvent outlet port 314 are connected, the third solvent equilibrates the first solid phase extraction column (SPE1) and the first reversed-phase liquid chromatography column (COL1) via the column selection valve 330.

Although 0.1% formic acid in water is used as the third solvent in this embodiment, the third solvent is not limited thereto and includes any solution in water capable of equilibrating the first solid phase extraction column (SPE1) and the first reversed-phase liquid chromatography column (COL1) or the second solid phase extraction column (SPE2) and the second reversed-phase liquid chromatography column (COL2).

The column selection valve 330 according to this embodiment plays a role in receiving the plurality of fractions supplied from the column equilibration valve 310 and supplying the plurality of fractions to the first solid phase extraction column (SPE1) or the second solid phase extraction column (SPE2) in alternating manner. Additionally, the column selection valve 330 plays a role in supplying a fourth solvent to the first solid phase extraction column (SPE1) so that the fraction is eluted with the first reversed-phase liquid chromatography column (COL1) in the first solid phase extraction column (SPE1), or supplying a fourth solvent to the second solid phase extraction column (SPE2) so that the fraction is eluted with the second reversed-phase liquid chromatography column (COL2) in the second solid phase extraction column (SPE2).

The column selection valve 330 includes a fraction and third solvent inlet port 331 connected to the third solvent outlet port 314 to allow the fraction or the third solvent to be introduced through, a fourth solvent inlet port 333 connected to a fourth pump P4 which supplies the fourth solvent to allow the fourth solvent to be introduced through, a fraction and third solvent outlet port 332 provided adjacent to the fraction and third solvent inlet port 331 and selectively connected to the fraction and third solvent inlet port 331 and the fourth solvent inlet port 333, and a fourth solvent outlet port 334 provided adjacent to the fourth solvent inlet port 333 and selectively connected to the fraction and third solvent inlet port 331 and the fourth solvent inlet port 333.

Describing the operation of equilibrating the second solid phase extraction column (SPE2) and the second reversed-phase liquid chromatography column (COL2), as shown in FIG. 6, in a state that the fraction and third solvent outlet port 332, the fraction and third solvent inlet port 331, and the third solvent outlet port 314 and the second fraction inlet port 311 are connected, the first fraction is supplied to the first solid phase extraction column (SPE1). Additionally, as shown in FIG. 7, in a state that the fourth solvent inlet port 333 and the fraction and third solvent outlet port 332 are connected, the fourth solvent elutes the first fraction with the first reversed-phase liquid chromatography column (COL1) in the first solid phase extraction column (SPE1), and in a state that the fraction and third solvent inlet port 331, the fourth solvent outlet port 334 and the third solvent outlet port 314 are connected, the third solvent is introduced into the second solid phase extraction column (SPE2) and the second reversed-phase liquid chromatography column (COL2) to equilibrate the second solid phase extraction column (SPE2) and the second reversed-phase liquid chromatography column (COL2).

In this embodiment, the fourth pump P4 supplies the fourth solvent to the fourth solvent inlet port 333, wherein the fourth solvent is a mixed solution of solution C, 0.1% formic acid in water, reducing from 99% to 60%, and solution D, 0.1% formic acid in acetonitrile, increasing from 1% to 40%. As above, the gradually increasing concentration of the solution D in the fourth solvent allows for easy elution of the first fraction in the first solid phase extraction column (SPE1) or easy elution of the second fraction in the second solid phase extraction column (SPE2).

Additionally, describing the operation of equilibrating the first solid phase extraction column (SPE1) and the first reversed-phase liquid chromatography column (COL1), as shown in FIG. 8, in a state that the fourth solvent outlet port 334, the fraction and third solvent inlet port 331, the third solvent outlet port 314 and the second fraction inlet port 311 are connected, the second fraction is supplied to the second solid phase extraction column (SPE2), then as shown in FIG. 9, in a state that the fourth solvent inlet port 333 and the fourth solvent outlet port 334 are connected, the fourth solvent elutes the second fraction with the second reversed-phase liquid chromatography column (COL2) in the second solid phase extraction column (SPE2), and in a state that the fraction and third solvent inlet port 331 and the fraction and third solvent outlet port 332 are connected, the third solvent is introduced into the first solid phase extraction column (SPE1) and the first reversed-phase liquid chromatography column (COL1) to equilibrate the first solid phase extraction column (SPE1) and the first reversed-phase liquid chromatography column (COL1).

Meanwhile, the dual column valve 400 according to this embodiment plays a role in performing separation and analysis of the fraction in one of the first reversed-phase liquid chromatography column (COL1) and the second reversed-phase liquid chromatography column (COL2), while performing equilibration on the other column.

The dual column valve 400 includes the first solid phase extraction column (SPE1) connected to the first reversed-phase liquid chromatography column (COL1) and the second solid phase extraction column (SPE2) connected to the second reversed-phase liquid chromatography column (COL2). The fraction is supplied to the first reversed-phase liquid chromatography column (COL1) through the first solid phase extraction column (SPE1) or the second reversed-phase liquid chromatography column (COL2) through the second solid phase extraction column (SPE2).

Additionally, the dual column valve 400 supplies the first to tenth fractions to the first reversed-phase liquid chromatography column (COL1) or the second reversed-phase liquid chromatography column (COL2) in alternating manner, and is in fluid communication with the column selection valve 330 which performs separation and analysis of the fraction in one of the first reversed-phase liquid chromatography column (COL1) and the second reversed-phase liquid chromatography column (COL2) while at the same time, performing equilibration on the other column.

To this end, the dual column valve 400 includes a first solid phase extraction column connection port 412 and a first solid phase extraction column channel port 413 each connected to two ends of the first solid phase extraction column (SPE1), a first solid phase extraction column inlet port 411 connected to the fraction and third solvent outlet port 332 and selectively connected to the first solid phase extraction column connection port 412 and the first solid phase extraction column channel port 413, a first reversed-phase liquid chromatography column port 414 connected to the first reversed-phase liquid chromatography column (COL1) and connected or disconnected to/from the first solid phase extraction column connection port 412, a second solid phase extraction column connection port 432 and a second solid phase extraction column channel port 433 each connected to two ends of the second solid phase extraction column (SPE2), a second solid phase extraction column inlet port 431 connected to the fourth solvent outlet port 334 and selectively connected to the second solid phase extraction column connection port 432 and the second solid phase extraction column channel port 433, and a second reversed-phase liquid chromatography column port 434 connected to the second reversed-phase liquid chromatography column (COL2) and connected or disconnected to/from the second solid phase extraction column connection port 432.

Describing the operation of supplying the first fraction to the first solid phase extraction column (SPE1) with reference to FIG. 6, in a state that the first solid phase extraction column connection port 412, the first solid phase extraction column inlet port 411, the fraction and third solvent outlet port 332, the fraction and third solvent inlet port 331 and the third solvent outlet port 314 are connected, the first fraction is supplied to the first solid phase extraction column (SPE1). Additionally, the dual column valve 400 further includes a first outlet port 451 provided adjacent to the first solid phase extraction column channel port 413 and connected or disconnected to/from the first solid phase extraction column channel port 413, and when the first fraction is supplied to the first solid phase extraction column (SPE1) and concentrated, salts are discharged through the first outlet port 451.

Additionally, referring to FIG. 7, to inject the first fraction into the first reversed-phase liquid chromatography column (COL1) and perform separation and analysis of the first fraction, in a state that the first reversed-phase liquid chromatography column port 414, the first solid phase extraction column connection port 412, the first solid phase extraction column channel port 413 and the first solid phase extraction column inlet port 411 are connected, the fourth solvent is introduced into the first solid phase extraction column (SPE1) along the fourth solvent inlet port 333 and the fraction and third solvent outlet port 332 and elutes the first fraction in the first solid phase extraction column (SPE1), and the first fraction is supplied to the first reversed-phase liquid chromatography column (COL1). Additionally, to equilibrate the second solid phase extraction column (SPE2) and the second reversed-phase liquid chromatography column (COL2) at the same time with separation and analysis of the first fraction, in a state that the second reversed-phase liquid chromatography column port 434, the second solid phase extraction column connection port 432, the second solid phase extraction column channel port 433 and the second solid phase extraction column inlet port 431 are connected, the third solvent is introduced into the second solid phase extraction column (SPE2) and the second reversed-phase liquid chromatography column (COL2) along the fraction and third solvent inlet port 331 and the fourth solvent outlet port 334 to equilibrate the second solid phase extraction column (SPE2) and the second reversed-phase liquid chromatography column (COL2).

Additionally, referring to FIG. 8, describing the operation of supplying the second fraction to the second solid phase extraction column (SPE2), in a state that the second solid phase extraction column connection port 432, the second solid phase extraction column inlet port 431, the fourth solvent outlet port 334, the fraction and third solvent inlet port 331 and the third solvent outlet port 314 are connected, the second fraction is provided to the second solid phase extraction column (SPE2). Additionally, the dual column valve 400 further includes a second outlet port 453 provided adjacent to the second solid phase extraction column channel port 433 and connected or disconnected to/from the second solid phase extraction column channel port 433, and when the second fraction is supplied to the second solid phase extraction column (SPE2) and concentrated, salts are discharged through the second outlet port 453.

Additionally, referring to FIG. 9, to inject the second fraction into the second reversed-phase liquid chromatography column (COL2) and perform separation and analysis of the second fraction, in a state that the second reversed-phase liquid chromatography column port 434, the second solid phase extraction column connection port 432, the second solid phase extraction column channel port 433 and the second solid phase extraction column inlet port 431 are connected, the fourth solvent is introduced into the second solid phase extraction column (SPE2) along the fourth solvent inlet port 333 and the fourth solvent outlet port 334 and elutes the second fraction in the second solid phase extraction column (SPE2), and the second fraction is supplied to the second reversed-phase liquid chromatography column (COL2).

Additionally, to equilibrate the first solid phase extraction column (SPE1) and the first reversed-phase liquid chromatography column (COL1) at the same time with separation and analysis of the second fraction, in a state that the first reversed-phase liquid chromatography column port 414, the first solid phase extraction column connection port 412, the first solid phase extraction column channel port 413 and the first solid phase extraction column inlet port 411 are connected, the third solvent is introduced into the first solid phase extraction column (SPE1) and the first reversed-phase liquid chromatography column (COL1) along the fraction and third solvent inlet port 331 and the fraction and third solvent outlet port 332 to equilibrate the first solid phase extraction column (SPE1) and the first reversed-phase liquid chromatography column (COL1).

In the foregoing way, the third to tenth fractions are supplied to the first solid phase extraction column (SPE1) and the first reversed-phase liquid chromatography column (COL1) or the second solid phase extraction column (SPE2) and the second reversed-phase liquid chromatography column (COL2) in alternating manner, followed by separation and analysis, and at the same time, the first solid phase extraction column (SPE1) and the first reversed-phase liquid chromatography column (COL1) or the second solid phase extraction column (SPE2) and the second reversed-phase liquid chromatography column (COL2) are equilibrated.

It is obvious to those skilled in the art that the present disclosure is not limited to the disclosed embodiments, and various modifications and variations may be made thereto without departing from the spirit and scope of the present disclosure. Therefore, such modifications or variations fall within the appended claims.

INDUSTRIAL APPLICABILITY

The present disclosure can improve reproducibility of fractionation and prevent a sample loss through automation of non-contiguous sample fractionation and concatenation process with low sample complexity and high fraction uniformity.

The invention claimed is:
1. A method of fractionating and concatenating samples in a timewise order based on unit fractionation intervals comprising the steps of:
  receiving a sample to be analyzed, wherein the sample is supplied from a sample injector of a sample supply module and storing the sample in a sample storage loop of a first sample supply valve, wherein the sample supply module comprises:
    the first sample supply valve to which a first pump and the sample injector are connected; and
    a second sample supply valve connected to the first sample supply valve;
    wherein the first sample supply valve includes:
    a first sample inlet port connected to the sample injector;
    a first sample outlet port provided adjacent to the first sample inlet port;
    a first solvent inlet port connected to the first pump;
    a first solvent outlet port provided adjacent to the first solvent inlet port and connected to the second sample supply valve; and
    a first sample storage loop connection port and a second sample storage loop connection port to which two ends of a sample storage loop are each connected;
    wherein the sample is stored in the sample storage loop in a state that the first sample storage loop connec- tion port and the second sample storage loop connection port are connected to the first sample inlet port and the first sample outlet port, respectively;

wherein the second sample supply valve includes:
- a second sample inlet port connected to the first solvent outlet port;
- a second sample outlet port provided adjacent to the second sample inlet port and connected to a sample fractionation module;
- wherein the sample fractionation module comprises a plurality of fraction storage loops provided equal to a number of unit fractionation intervals within each unit sample supply time; and
- a sample separation column having a first and a second end, wherein the first end is connected to the second sample inlet port and the second end is connected to the second sample outlet port;

supplying a first solvent from the first pump and injecting the sample stored in the sample storage loop into the sample separation column of the second sample supply valve;

wherein in the state that the first sample storage loop connection port and the second sample storage loop connection port are connected to the first solvent inlet port and the first solvent outlet port, respectively, injecting the first solvent into the sample storage loop and injecting the sample into the sample separation column;

supplying the first solvent from the first pump and separating and eluting the sample injected into the sample separation column;

continuously introducing the separated and eluted sample into the sample fractionation module; and injecting the separated and eluted sample in the sample fractionation module into each of the plurality of fraction storage loops for the unit fractionation intervals during the unit sample supply time, and non-contiguously fractionating and concatenating and storing the sample by repeating the step of injecting the separated and eluted sample in the sample fractionation module across a plurality of unit sample supply times;

wherein the unit fractionation intervals are positioned in a same order within a unit sample supply time of a total sample supply time to acquire a plurality of fractions;

wherein the total sample supply time is an entire duration in which the separated and eluted sample in the sample separation column is supplied from the second supply valve to the sample fractionation module;

wherein each unit sample supply time is an equal division of the total sample supply time in timewise order; and wherein the unit fractionation intervals are equal divisions of each unit sample supply time in timewise order by a final number of fractions.

2. The method of claim 1, wherein the sample fractionation module further includes:
- a first fractionation valve connected to the second sample supply valve to receive the sample from the second sample outlet port in the step of continuously introducing the separated and eluted sample in the sample separation column;
- a second fractionation valve provided adjacent to the first fractionation valve; and
- a plurality of fraction storage loops equal to a number of the unit fractionation intervals within each unit sample supply time, wherein each fraction storage loop has one end connected to the first fractionation valve and a second end connected to the second fractionation valve to concatenate and store the separated and eluted sample supplied from the sample separation column, and wherein the step of injecting the separated and eluted sample in the sample fractionation module into each of the plurality of sample storage loops for the unit fractionation intervals during the unit sample supply time, and non-contiguously fractionating and concatenating and storing the sample by repeating the step of injecting the separated and eluted sample in the sample fractionation module across a plurality of unit sample supply times comprises:

switching the first fractionation valve and the second fractionation valve at the same time to form a sequential fractionation cycle in which the separated and eluted sample in the sample separation column is stored in the plurality of fraction storage loops equal to the number of unit fractionation intervals within each unit sample supply time in a sequential order during the unit sample supply time; and repeating the sequential fractionation cycle at each unit sample supply time to non-contiguously concatenate the separated and eluted sample in a number of sample separation columns equal to the number of unit sample supply times within the plurality of fraction storage loops.

3. The method of claim 2, wherein the first fractionation valve includes:
- a fraction inlet port through which the separated and eluted sample in the sample separation column is continuously introduced from the second sample supply valve;
- a plurality of first fraction storage loop connection ports provided adjacent to the fraction inlet port, each connected to one end of the plurality of fraction storage loops; and
- a first connecting channel connecting the fraction inlet port and one of the plurality of first fraction storage loop connection ports in communication with each other corresponding to the unit fractionation interval, and the second fractionation valve includes:
- a plurality of second fraction storage loop connection ports to which the other end of the plurality of fraction storage loops is each connected;
- a fraction outlet port provided adjacent to the plurality of second fraction storage loop connection ports, and connected to the other end of one of the plurality of fraction storage loops to discharge the fraction; and
- a second connecting channel connecting the fraction outlet port and one of the plurality of second fraction storage loop connection ports in communication with each other corresponding to the unit fractionation interval.

4. The method of claim 1, further comprising the steps of:
setting the total sample supply time;
setting the unit sample supply time; and
setting the unit fraction intervals.

* * * * *